(12) United States Patent
Horimizu et al.

(10) Patent No.: US 10,549,786 B2
(45) Date of Patent: Feb. 4, 2020

(54) COWL COVER

(71) Applicant: NIHON PLAST CO., LTD., Shizuoka (JP)

(72) Inventors: Yasumasa Horimizu, Shizuoka (JP); Atsushi Ihara, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 15/993,642

(22) Filed: May 31, 2018

(65) Prior Publication Data

US 2018/0346035 A1 Dec. 6, 2018

(30) Foreign Application Priority Data

May 31, 2017 (JP) .................................. 2017-107656

(51) Int. Cl.
*B62D 25/08* (2006.01)
*B60R 21/34* (2011.01)
*B62D 27/04* (2006.01)

(52) U.S. Cl.
CPC ............ *B62D 25/081* (2013.01); *B60R 21/34* (2013.01); *B62D 27/04* (2013.01); *B60R 2021/343* (2013.01)

(58) Field of Classification Search
CPC ...... B62D 25/081; B62D 27/04; B60R 21/34; B60R 2021/343

USPC ......................................................... 296/192
See application file for complete search history.

(56) References Cited

U.S. PATENT DOCUMENTS 9,381,947 B2 * 7/2016 Serizawa ............. B62D 25/081
9,849,917 B2 * 12/2017 Ishihara ............... B62D 25/081

FOREIGN PATENT DOCUMENTS

| JP | 4337778 B2 | | 9/2009 |
| JP | 2011-73566 | * | 4/2011 |
| JP | 2011-5988 | * | 1/2013 |
| JP | 5213827 | * | 6/2013 |

* cited by examiner

*Primary Examiner* — Dennis H Pedder
(74) *Attorney, Agent, or Firm* — Brundidge & Stanger, P.C.

(57) ABSTRACT

A cowl cover includes a cover-body portion that covers a cowl portion between a windshield and a vehicle-body member; and a lid body to be detachably attached to the cover-body portion. The cover-body portion includes a cover-body-side engagement portion and the lid-body includes a lid-body-side engagement portion that is to be engaged with the cover-body-side engagement portion. The cover-body-side engagement portion and the lid-body-side engagement portion are configured such that an engagement amount between the cover-body-side engagement portion and the lid-body-side engagement portion increases when a load is applied from an outside to the lid-body-side engagement portion.

2 Claims, 8 Drawing Sheets

COWL COVER

CROSS REFERENCE TO RELATED APPLICATIONS

This application is entitled to and claims the benefit of Japanese Patent Application No. 2017-107656, filed on May 31, 2017, the disclosure of which including the specification, drawings and abstract is incorporated herein by reference in its entirety.

TECHNICAL FIELD

The present invention relates to a cowl cover.

BACKGROUND ART

Cowl covers used for covering a cowl portion between a windshield and a vehicle-body member have been publicly known (e.g., Japanese Patent Publication No. 4337778 (PTL 1)). The cowl cover described in PTL 1 includes a cover-body portion which includes one end portion to be locked to an edge portion of a windshield and another end portion to be locked to an attachment portion of a vehicle-body member. A separate body structure (shock absorbing part) is detachably attached to this cover-body portion.

CITATION LIST

Patent Literature

PTL 1
Japanese Patent Publication No. 4337778

SUMMARY OF INVENTION

Technical Problem

In PTL 1, shock absorption by the cowl cover is made possible by reducing the rigidity of the cover-body portion by causing the separate body structure to fall off from the cover-body portion when a load is applied from outside to the separate body structure. There is, however, a possibility that an initial reaction force becomes adversely large in order to release the engaged state between the cover-body portion and the separate body portion when a load is applied from outside to the separate body structure.

In this respect, an object of the present invention is to improve the effects of shock absorption of the cowl cover by allowing deformation and/or displacement of the separate body structure while maintaining the engaged state between the cover-body portion and the separate body portion when a load is applied from outside to the separate body structure.

Solution to Problem

A cowl cover according to an embodiment of the present invention includes: a cover-body portion that covers a cowl portion between a windshield and a vehicle-body member; and a separate body structure to be detachably attached to the cover-body portion. The cover-body portion includes a cover-body-side engagement portion, and the separate body structure includes a separate-body-structure-side engagement portion that is to be engaged with the cover-body-side engagement portion. The cover-body-side engagement portion and the separate-body-structure-side engagement portion are configured such that an engagement amount between the cover-body-side engagement portion and the separate-body-structure-side engagement portion increases when a load is applied from outside to the separate-body structure.

Advantageous Effects of Invention

With the cowl cover according to the present invention, the effects of shock absorption by the cowl cover can be improved by allowing deformation and/or displacement of the separate body structure while maintaining the locked state between the cover-body portion and the separate body portion when a load is applied from outside to the separate body structure.

DESCRIPTION OF EMBODIMENTS

Hereinafter, an embodiment of the present invention will be described in detail with reference to the drawings.

Note that, a front-rear direction, a left-right direction, and an up-down direction are defined with reference to the state in which a cowl cover is attached to a vehicle, hereinafter. In the drawings, arrow FR indicates the forward direction of the vehicle.

Figure 1:
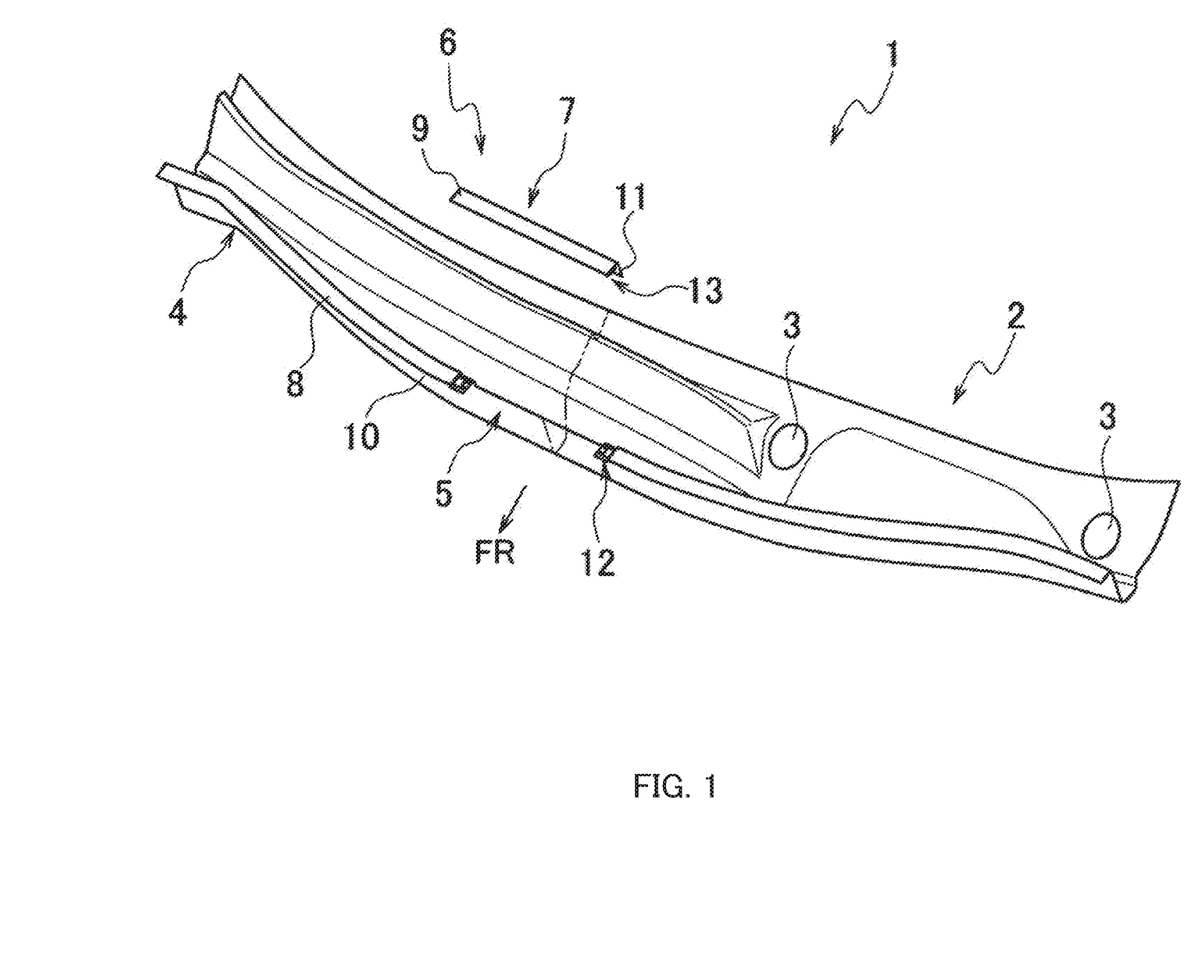
FIG. 1 is an exploded perspective view of a cowl cover according to an embodiment of the present invention.

Cowl cover (cowl top cover) 1 illustrated in FIG. 1 is disposed between a windshield (front glass) and a vehicle-body member (e.g., vehicle-body panel). Furthermore, the cowl cover extends in the left-right direction for covering a cowl portion between the windshield and the vehicle-body panel. Cowl cover 1 includes cover-body portion 2, which is formed by a relatively hard resin member (e.g., ABS resin, modified PPO resin and/or the like).

In cover-body portion 2, wiper pivot holes 3, each being a hole through which a wiper shaft of a wiper is passed. Moreover, a mesh-shaped air-introduction hole (not illustrated) is formed in cover-body portion 2. This air-introduction hole is used as an air-introduction hole when outside air is introduced into the vehicle interior via an air-conditioner (not illustrated), for example.

Figure 2:
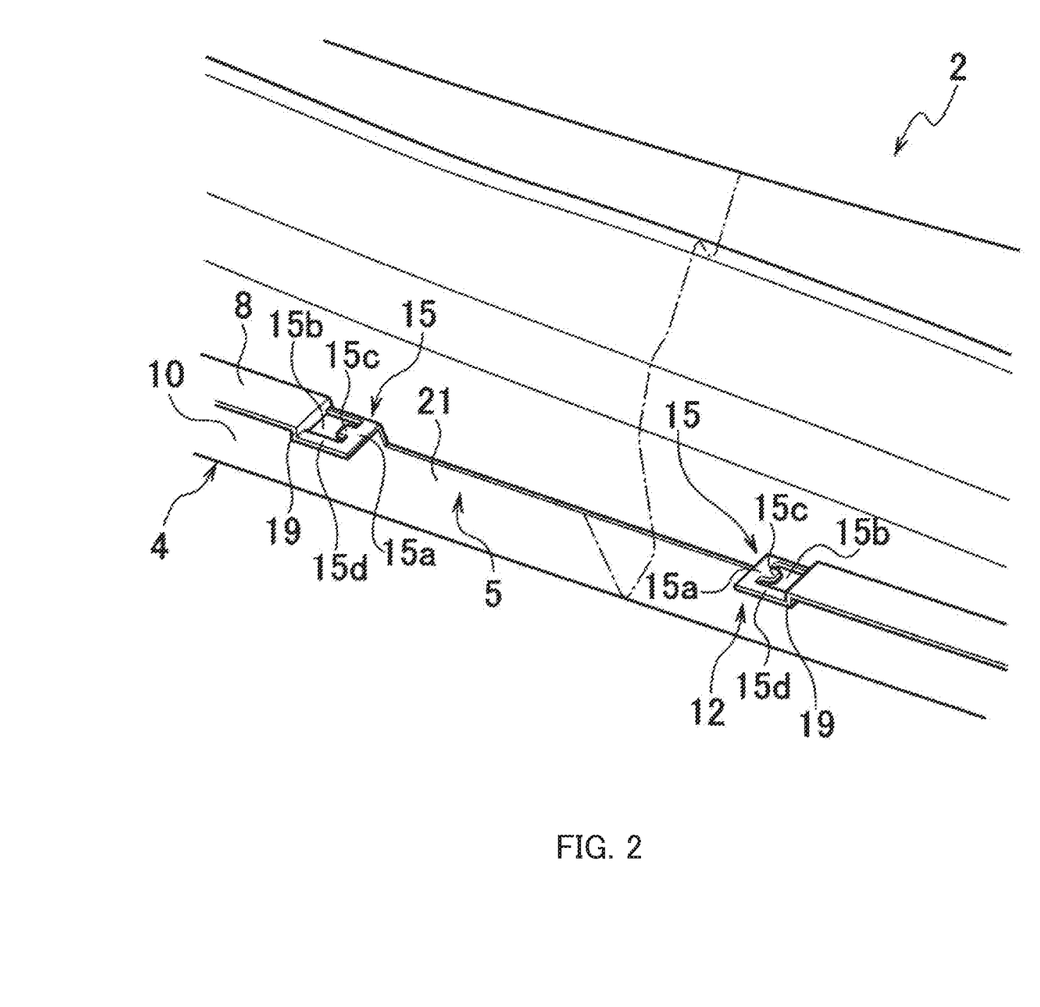
FIG. 2 is a main-part enlarged perspective view illustrating a cover-body-side engagement portion.
Figure 3:
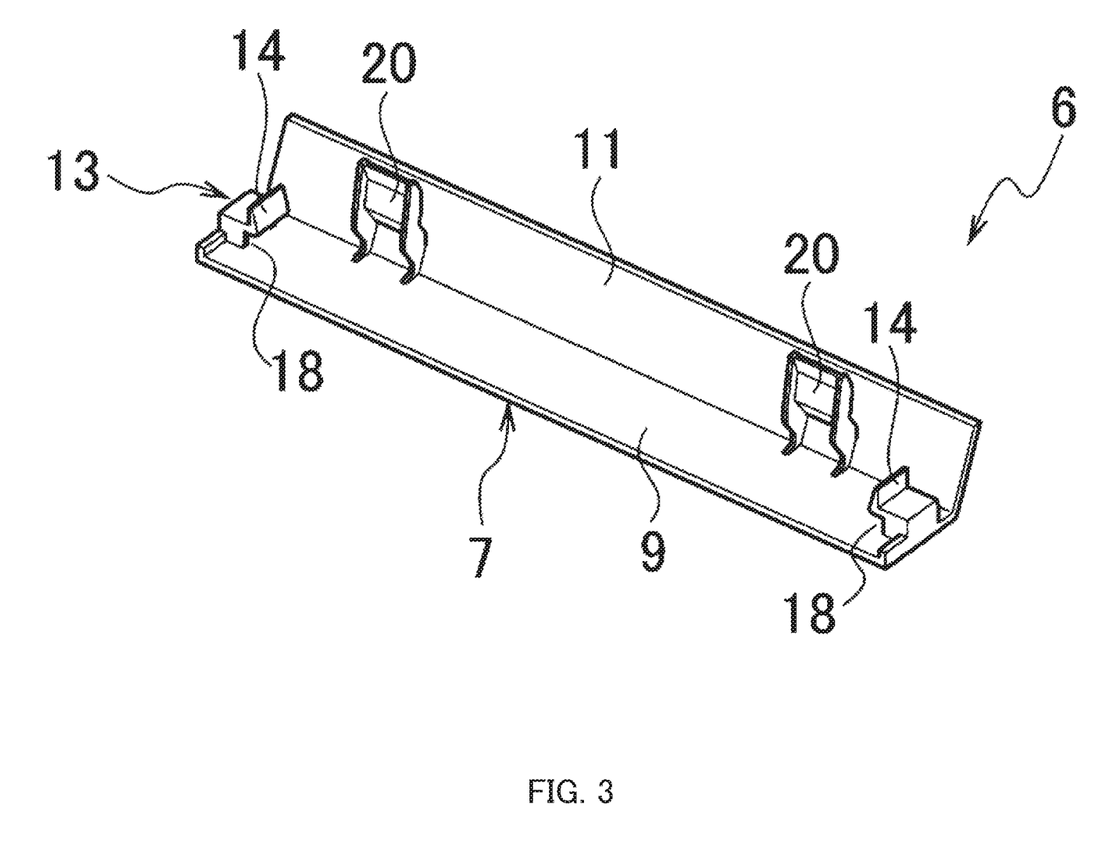
FIG. 3 is a perspective view illustrating a lid-body-side engagement portion.
Figure 4:
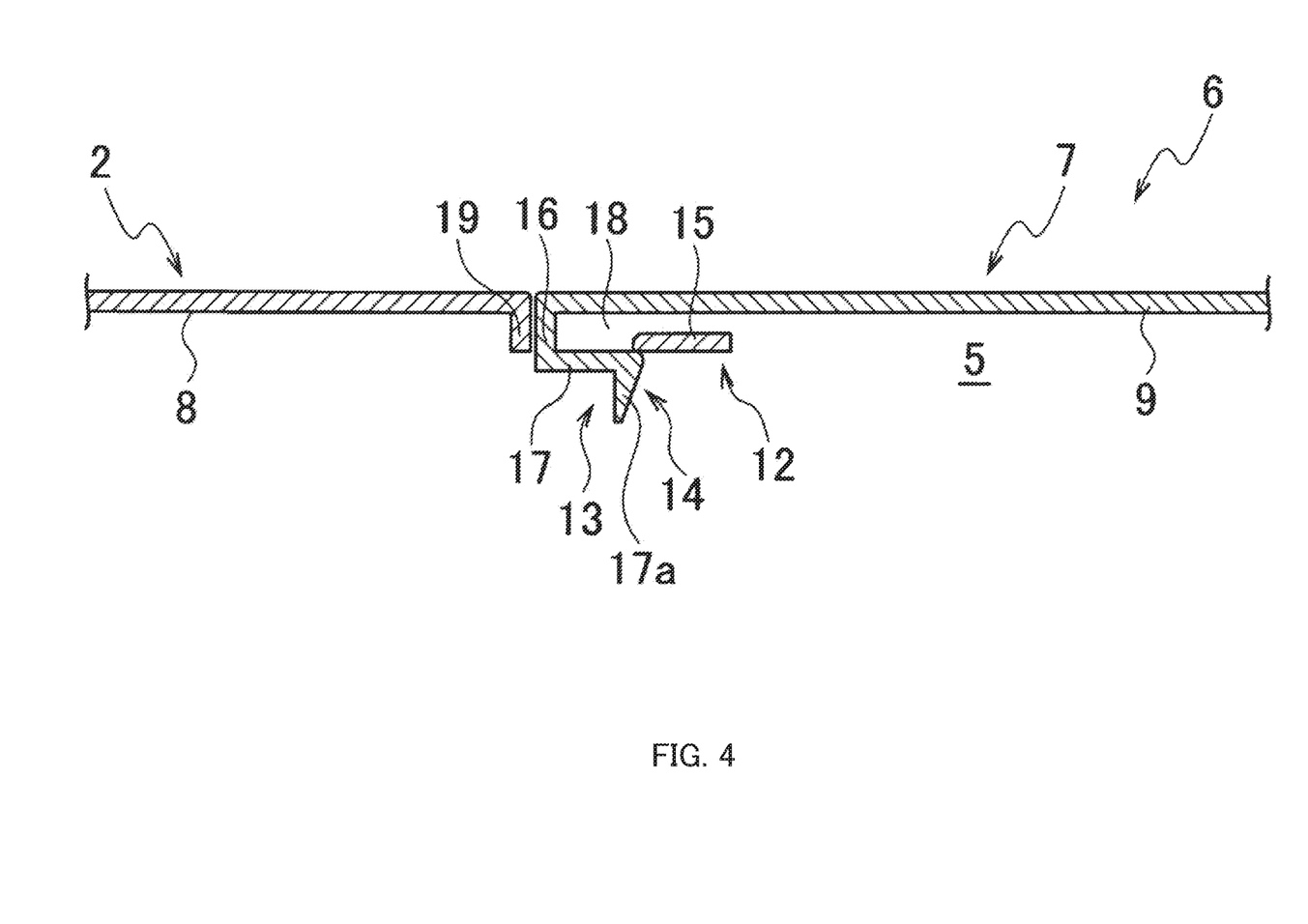
FIG. 4 is an explanatory diagram illustrating an attachment state of a lid body with respect to a cover-body portion.

As illustrated in FIG. 2 through FIG. 4, opening (notch portion) 5 is formed in front end portion 4 of cover-body portion 2, which is of a substantially rectangular shape in planar view. Opening 5 is closed (covered) by lid body (separate body structure) 6, which is to be detachably attached to cover-body portion 2. Lid body 6 extends along the left-right direction for closing (covering) opening 5 of cover-body portion 2 in a state where lid body 6 is attached to cover-body portion 2.

Lid body 6 is also referred to as "lid," "cap," or the like, and is a body separate from cover-body portion 2. Lid body 6 is a small member (a small member compared with cover-body portion 2) that forms part of cowl cover 1 other than cover-body portion 2. Lid body 6 is configured to be attachable from above to front end portion 4 of cover-body portion 2. Lid body 6 is formed by a resin member having rigidity lower than or equal to cover-body portion 2.

Lid body 6 is configured to have lid-body body portion 7, which forms part of front end portion 4 of cover-body portion 2. Lid-body body portion 7 is formed to have a sectional shape (L-shaped cross section) identical to front end portion 4 of cover-body portion 2. More specifically, lid-body body portion 7 includes: lid-body-side seal surface portion 9, which forms part of body-side seal surface portion 8 where a seal member (not illustrated) is disposed; and lid-body-side slope portion 11, which forms part of body-side slope portion 10 to be formed so as to extend to body-side seal surface portion 8.

Cover-body portion 2 has cover-body-side engagement portions 12. Meanwhile, lid body 6 has lid-body-side engagement portions (separate-body-structure side engagement portions) 13, which are to be engaged with cover-body-side engagement portions 12. Lid body 6 is attached to cover-body portion 2 by causing cover-body-side engagement portions 12 and lid-body-side engagement portions 13 to be detachably engaged with each other.

In this embodiment, engagement hooks 14 are provided in engagement portions on a side of lid body 6 (lid-body-side engagement portions 13) (see FIG. 3). Meanwhile, engagement hooked portions 15 where engagement hooks 14 are engaged and locked thereto are provided in engagement portions on a side of cover-body portion 2 (cover-body-side engagement portions 12) (see FIG. 2).

Engagement hooks 14 are provided respectively on both end portions of lid-body body portion 7 in the left-right direction (see FIG. 3). Each of engagement hooks 14 has: first portion 16, which extends downward from a lower surface of lid-body-side seal surface portion 9 of lid-body body portion 7; and second portion 17, which extends inward from a leading-end portion of first portion 16 in the left-right direction (center side of vehicle-width direction). Each of engagement hooks 14 is thus formed to have an L-shaped cross section. In second portion 17 of engagement hook 14, downward protrusion 17a, which protrudes downward from a leading end is formed, and a contact surface with engagement hooked portion 15 in this downward protrusion 17a is formed to have a tapered shape. Forming the contact surface with engagement hooked portions 15 in these downward protrusions 17a to have a tapered shape extending from upward to downward and sloping outward in the left-right direction (side opposite to engagement hooked portions 15) causes downward protrusions 17a to serve as a guide when engagement hooks 14 are locked to engagement hooked portions 15. Receptive portions 18 are each formed in a space having a substantially U-shaped cross section, which is surrounded by an end portion of lid-body-side seal surface portion 9, and first portion 16 and second portion 17, which form engagement hook 14.

Meanwhile, engagement hooked portions 15 are provided while being positioned at both end portions of opening 5, respectively, in the left-right direction (see FIG. 2). Engagement hooked portions 15 are provided to reception base portions 15a, which are provided at both end portions of opening 5 in the left-right direction. Each of engagement hooked portions 15 includes opening 15b into which engagement hook 14 is insertable. In this embodiment, opening 15b of engagement hooked portion 15 extends with long sides along the left-right direction. Elastic pieces 15c, each having a tongue piece shape, are formed by cutting out part of opening edges to be on the side of reception base portions 15a in the left-right direction of engagement hooked portions 15. Elastic pieces 15c are to be positioned in a state where elastic pieces 15c partly enter receptive portions 18 when lid body 6 is attached to cover-body portion 2. More specifically, in this state, free-end upper surfaces of second portions 17 of engagement hooks 14 and free-end lower surfaces of elastic pieces 15c come into contact with each other by an amount sufficient to prevent lid body 6 from easily moving upward (from falling off), and the free-ends of elastic pieces 15c and inward surfaces of first portions 16 of engagement hooks 14 face each other. With receptive portions 18 formed in lid body 6, the free-ends of elastic pieces 15c and the inward surfaces of first portions 16 of engagement hooks 14 are positioned apart from each other by a constant distance, and thus, inward movement of lid body 6 (engagement hooks 14) in the left-right direction to some extent is allowed. Moreover, by forming elastic pieces 15c in the contact portions with engagement hooks 14 in engagement hooked portions 15, engagement hooks 14 become flexible at the time of insertion, and thus the insertability of engagement hooks 14 can be enhanced.

Contact portions 19 which extend downward from body-side seal surface portion 8 are formed in the edge portions of opening 5. Contact portions 19 mainly have a function to regulate lid body 6 attached to cover-body portion 2 from moving outward in the left-right direction and to position lid body 6. In this embodiment, engagement hooked portions 15 are formed so as to be flush with extension portions 15d which extend inward of the left-right direction from the lower ends of contact portions 19 (see FIG. 2). More specifically, engagement hooked portions 15 are formed in a position lowered by one step from body-side seal surface portion 8.

Moreover, engagement pieces 20, each having an L-shaped cross section, are provided in lid-body-side slope portion 11 of lid-body body portion 7, and engaged-pieces 21 with which engagement pieces 20 are engaged are provided in body-portion-side slope portion 10 of cover-body portion 2. Engaged-pieces 21 mainly have a function to regulate lid-body 6 from moving in the front-rear direction and downward direction and to position lid-body 6.

Lid-body 6 configured in the manner described above is attached from above to cover-body portion 2. More specifically, engagement hooks 14 of lid-body 6 are engaged with engagement hooked portions 15 and thus locked, and engagement of engagement pieces 20 of lid-body 6 with engaged-pieces 21 of cover-body portion 2 attaches lid-body (separate body structure) 6 to cover-body portion 2. Thus, lid body 6 can be easily attached to cover-body portion 2.

Hereinafter, an operational effect of the present embodiment will be described.

Figure 5:
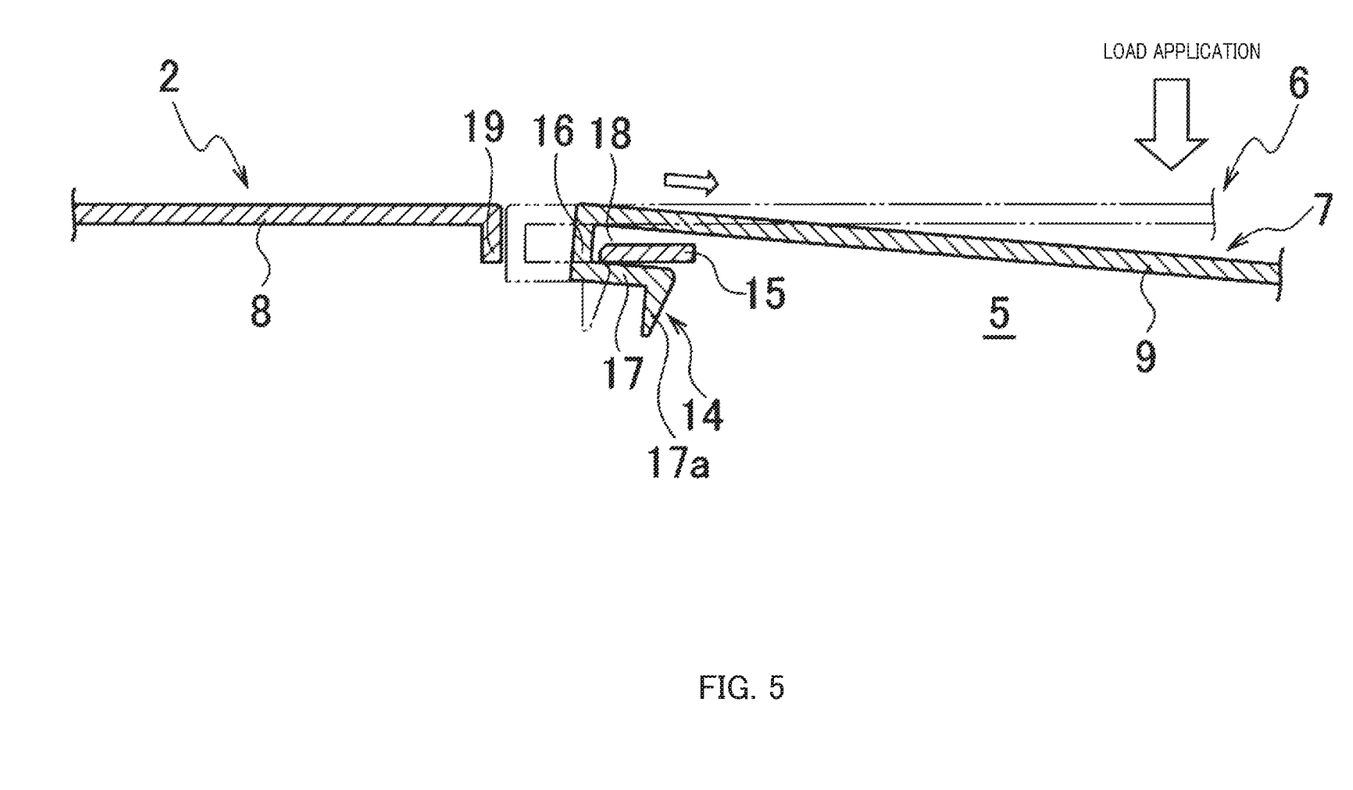
FIG. 5 is an explanatory diagram illustrating an attachment state of the lid body during an initial period of load application.

When a load is applied from outside to lid-body 6 (initial period of load application), as illustrated in FIG. 5, lid-body 6 is pressed downward by this outside force. When lid-body 6 deforms by being pressed downward, the positions of both end portions of lid-body 6 move inward in the left-right direction of lid-body 6. Elastic pieces 15c of engagement hooked portions 15 of cover-body portion 2 enter the depth side of receptive portions 18 of lid-body 6, i.e., enter inside the spaces, each having a substantially U-shaped cross section from the opening side of the space, and thus, the engagement amount of engagement hooked portions 15 and engagement hooks 14 increases. For this reason, allowing deformation and/or displacement of lid-body 6 makes it possible to suppress the initial reaction force without releasing the engaged state between cover-body portion 2 and lid-body 6. Note that, the term "engagement amount" means an overlapping amount (length or area) of engagement hooks 14 and engagement hooked portions 15 in the up-down direction.

Figure 6:
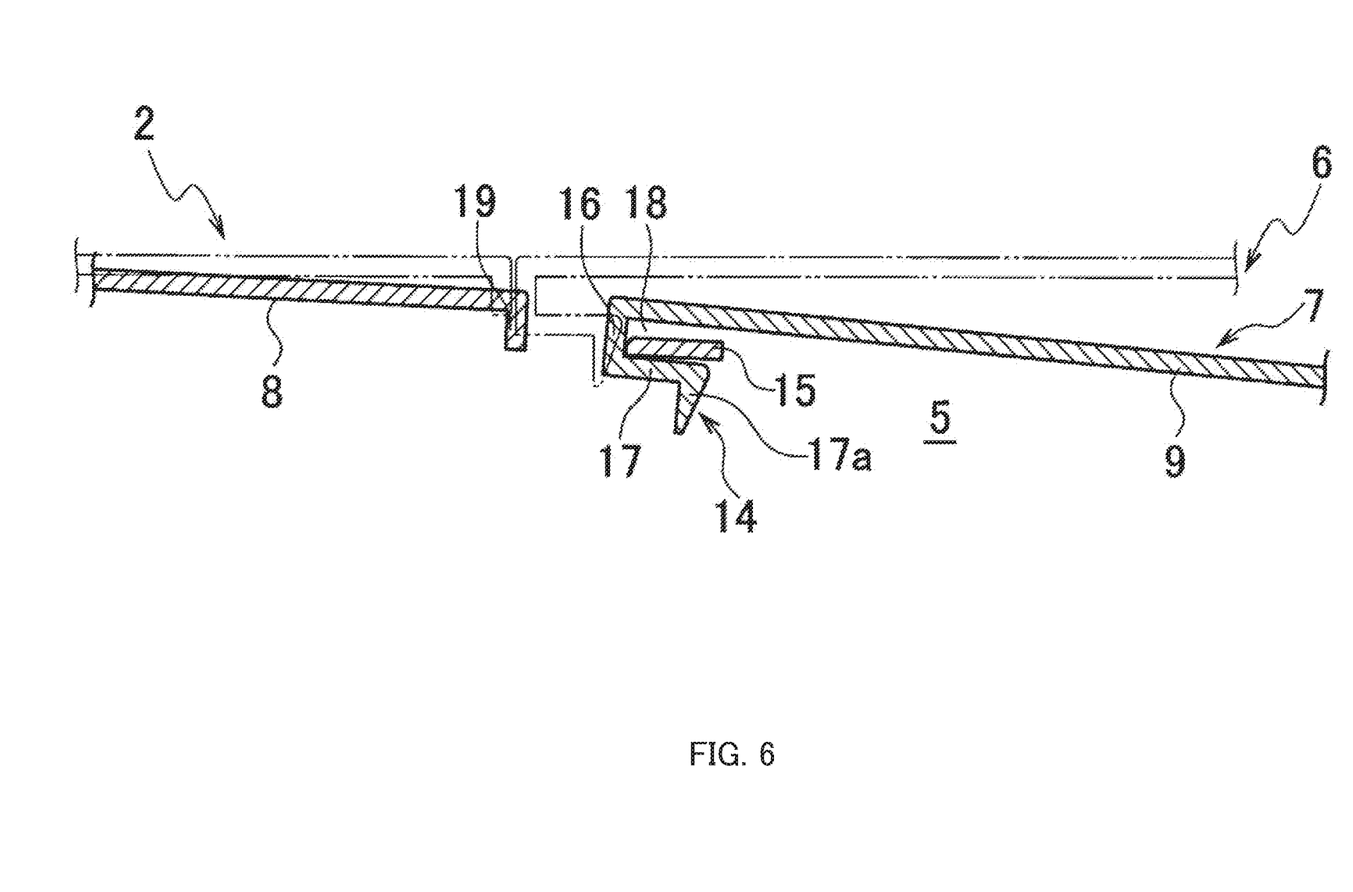
FIG. 6 is an explanatory diagram illustrating the attachment state of the lid body during a later period of the load application.

During a later period of load application, as illustrated in FIG. 6, the state in which the increased engagement amount between the engagement portions of cover-body portion 2 and the engagement portions of lid body 6 is maintained, and thus, the engagement state between cover-body portion 2 and lid body 6 is maintained. Thus, during a later period of load application, by allowing cover-body portion 2 to deform, the energy of shock load can be effectively absorbed.

Moreover, increasing the engagement amount along a longitudinal direction (vehicle-width direction) of cover-body portion 2 makes it possible to secure a large increase in the engagement amount as compared with a case where the engagement amount is increased along a short direction of cover-body portion 2 (vehicle-length direction).

In this embodiment, engagement hooks 14 are provided in lid-body 6, and engagement hooked portions 15 are provided in cover-body portion 2. Reversely, engagement hooks 14 may be provided in cover-body portion 2, and engagement hooked portions 15 may be provided in lid-body 6.

Note that, the cowl cover of the present invention has been described using the aforementioned embodiment as an example, but the cowl cover of the present invention is not limited to this embodiment, and a variety of other embodiments can be employed within a range not departing from the gist of the present invention.

Figure 7:
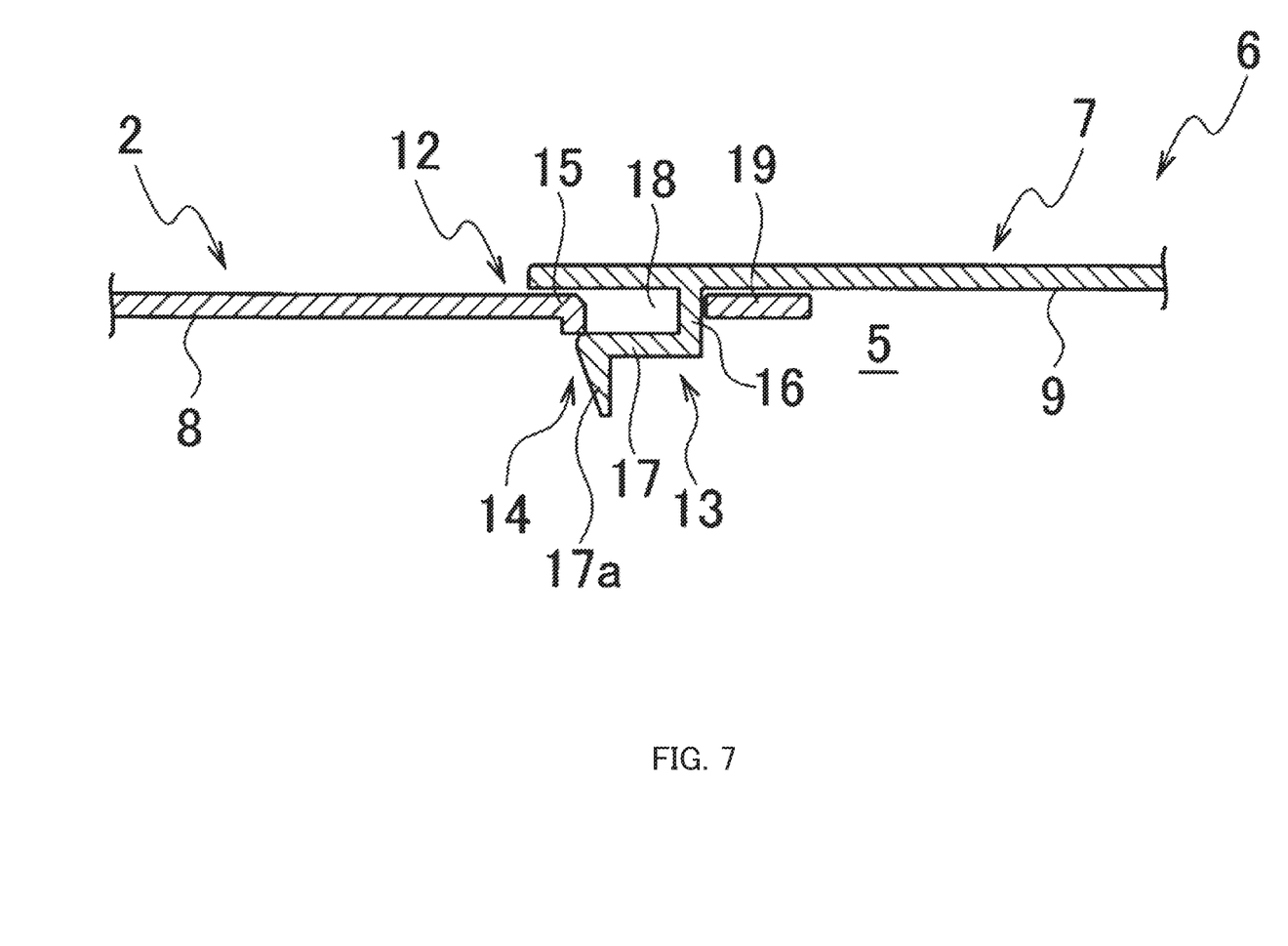
FIG. 7 is an explanatory diagram illustrating an attachment state of a lid body with respect to a cover-body portion in a cowl cover according to another embodiment of the present invention.
Figure 8:
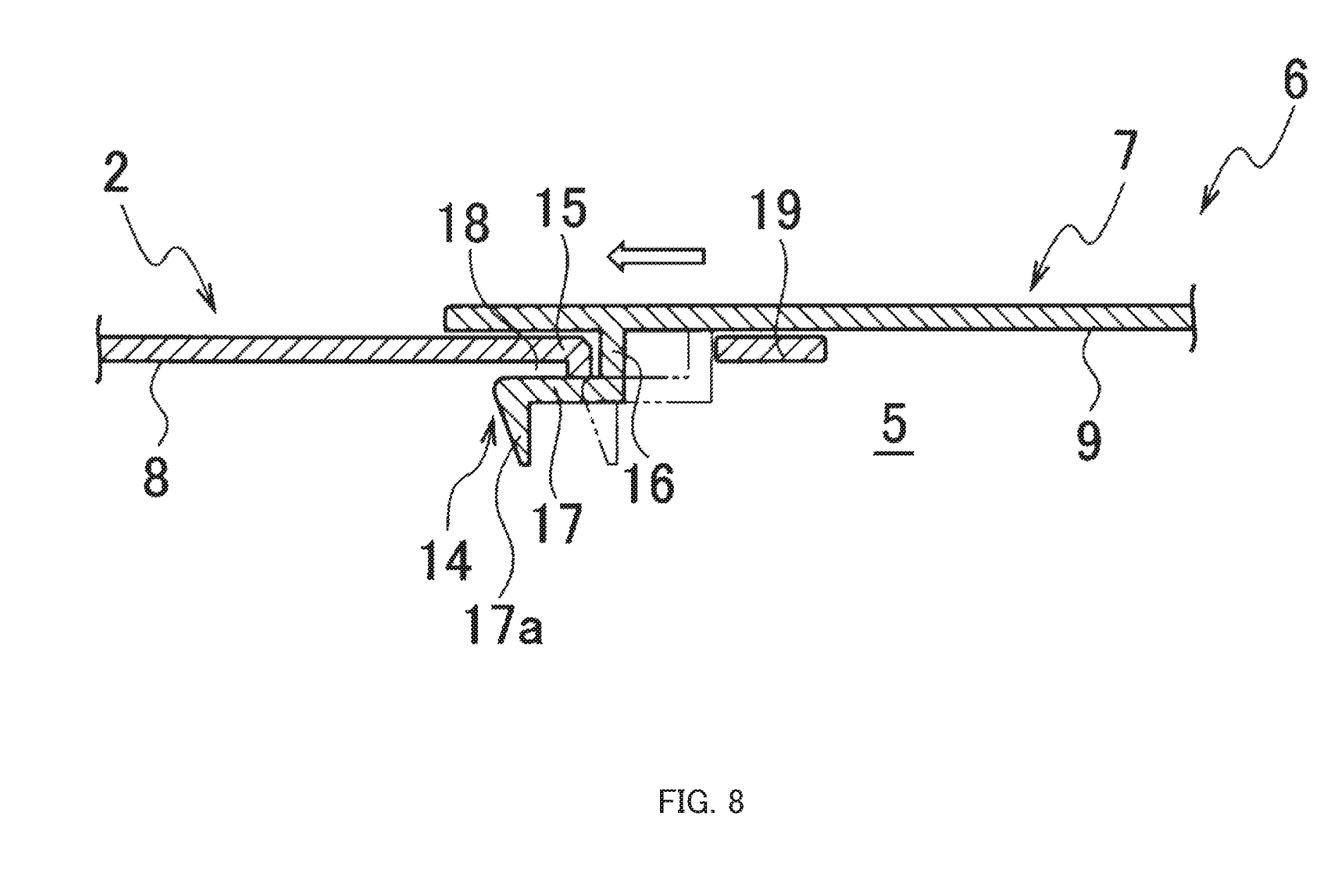
FIG. 8 is an explanatory diagram illustrating an attachment state of the lid body during an initial period of load application.

As illustrated in FIGS. 7 and 8, for example, the direction of engagement hooks 14 may be reverse to the direction described in the aforementioned embodiment. In this case, arrangement of engagement hooked portions 15 and contact portions 19 is reverse to the arrangement described in the aforementioned embodiment in order to match the change of the direction of engagement hooks 14. More specifically, the direction of engagement hooks 14 is appropriately selectable in accordance with a deformation mode that may occur in lid body 6 when a load is applied from outside.

Moreover, although not illustrated, engagement hook 14 and engagement hooked portion 15 may be provided at only one position instead of a plurality of positions, in accordance with a deformation mode that may occur in lid body 6 when a load is applied from outside.

REFERENCE SIGNS LIST

1 Cowl cover
2 Cover-body portion
6 Lid body (separate body structure)
12 Cover-body-side engagement portion
13 Lid-body-side engagement portion (separate-body-structure-side engagement portion)
14 Engagement hook
15 Engagement hooked portion

The invention claimed is:
1. A cowl cover, comprising:
a cover-body portion for covering a cowl portion between a windshield and a vehicle-body member; and
a separate body structure to be detachably attached to the cover-body portion, wherein:
the cover-body portion includes a cover-body-side engagement portion, and
the separate body structure includes a separate-body-structure-side engagement portion that is to be engaged with the cover-body-side engagement portion, wherein
the cover-body-side engagement portion and the separate-body-structure-side engagement portion are configured such that an engagement amount between the cover-body-side engagement portion and the separate-body-structure-side engagement portion increases when a load is applied from outside to the separate-body structure, and wherein,
the cover-body portion has a rectangular shape in planar view, and the cover-body-side engagement portion and the separate-body-structure-side engagement portion are configured such that the engagement amount between the cover-body-side engagement portion and the separate-body-structure-side engagement portion increases along a longitudinal direction of the cover-body portion.
2. The cowl cover according to claim 1, wherein
an engagement hook is provided in the separate-body-structure-side engagement portion, and an engagement hooked portion to which the engagement hook is to be locked is provided in the cover-body-side engagement portion.

* * * * *